(12) United States Patent
Jeong et al.

(10) Patent No.: US 9,086,601 B2
(45) Date of Patent: Jul. 21, 2015

(54) LIQUID CRYSTAL DISPLAY

(75) Inventors: Youn Hak Jeong, Cheonan-si (KR); Gak Seok Lee, Cheonan-si (KR); Kichul Shin, Asan-si (KR); Heehwan Lee, Seoul (KR); Jiphyo Hong, Pyeongtaek-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 184 days.

(21) Appl. No.: 13/414,142

(22) Filed: Mar. 7, 2012

(65) Prior Publication Data

US 2013/0057813 A1   Mar. 7, 2013

(30) Foreign Application Priority Data

Sep. 7, 2011 (KR) .................. 10-2011-0090910

(51) Int. Cl.
*G02F 1/1343* (2006.01)
*G02F 1/1335* (2006.01)

(52) U.S. Cl.
CPC ............. *G02F 1/134309* (2013.01); *G02F 2001/133618* (2013.01); *G02F 2001/134381* (2013.01); *G02F 2201/123* (2013.01); *G02F 2201/40* (2013.01)

(58) Field of Classification Search
CPC .............................................. G02F 1/134309
USPC .......................................................... 349/141
See application file for complete search history.

(56) References Cited

U.S. PATENT DOCUMENTS

| | | | |
|---|---|---|---|
| 6,650,390 B2 | 11/2003 | Sakamoto et al. | |
| 7,450,207 B2 | 11/2008 | Shimoshikiryo | |
| 2001/0019391 A1* | 9/2001 | Kim et al. | 349/139 |
| 2008/0303997 A1* | 12/2008 | Takeda et al. | 349/129 |
| 2008/0309613 A1* | 12/2008 | Bae | 345/107 |
| 2010/0128189 A1* | 5/2010 | Teranishi et al. | 349/33 |
| 2010/0245733 A1 | 9/2010 | Ono | |
| 2011/0228206 A1* | 9/2011 | Sawado | 349/139 |

FOREIGN PATENT DOCUMENTS

| | | |
|---|---|---|
| JP | 2005049907 A | 2/2005 |
| KR | 1020020088456 A | 11/2002 |
| KR | 1020070101071 A | 10/2007 |
| KR | 1020090027920 A | 3/2009 |
| KR | 1020100073285 A | 7/2010 |
| KR | 1020100078308 A | 7/2010 |
| KR | 1020100090835 A | 8/2010 |

* cited by examiner

*Primary Examiner* — Edward Glick
*Assistant Examiner* — Alexander Gross
(74) *Attorney, Agent, or Firm* — Cantor Colburn LLP

(57) ABSTRACT

A liquid crystal display includes a first substrate including a plurality of pixel areas, a second substrate facing the first substrate, and a liquid crystal layer disposed between the first substrate and the second substrate. The first substrate includes a first base substrate, a first pixel electrode disposed on the first base substrate and corresponding to each pixel area, a shielding electrode spaced apart from and insulated from the first pixel electrode, a passivation layer disposed on the first pixel electrode and the shielding electrode, and a second pixel electrode disposed on the passivation layer and partially overlapped with the first pixel electrode.

20 Claims, 12 Drawing Sheets

LIQUID CRYSTAL DISPLAY

This application claims priority to Korean Patent Application No. 10-2011-0090910 filed on Sep. 7, 2011, and all the benefits accruing therefrom under 35 U.S.C. §119, the contents of which are herein incorporated by reference in its entirety.

BACKGROUND OF THE INVENTION

1. Field of the Invention

The invention relates to a liquid crystal display. More particularly, the invention relates to a liquid crystal display having an improved aperture ratio.

2. Description of the Related Art

In general, a liquid crystal display includes two transparent substrates and a liquid crystal layer disposed between the two substrates. The liquid crystal display drives liquid crystal molecules in the liquid crystal layer to control a light transmittance in each pixel, thereby displaying desired images.

Among various operating modes for the liquid crystal display, a vertical alignment mode vertically aligns the liquid crystal molecules when an electric field is formed between the two substrates to allow light to transmit through the liquid crystal molecules, to thereby display the images. As one of the vertical alignment modes for the liquid crystal display, a patterned-vertical alignment ("PVA") mode has been widely used. According to the PVA mode, the liquid crystal molecules are aligned in different directions by patterned pixel electrodes so as to form liquid crystal domains, thereby improving a viewing angle of the liquid crystal layer. The pixel electrodes are patterned to include fine slits and a fringe electric field formed between the slits drives the liquid crystal molecules.

BRIEF SUMMARY OF THE INVENTION

Exemplary embodiments of the invention provide a liquid crystal display capable of reducing misalignment of liquid crystals and improving an aperture ratio.

According to the exemplary embodiments, a liquid crystal display includes a first substrate including a plurality of pixel areas, a second substrate facing the first substrate, and a liquid crystal layer disposed between the first substrate and the second substrate.

The first substrate includes a first base substrate, a first pixel electrode disposed on the first base substrate and corresponding to each pixel area, a shielding electrode spaced apart from and insulated from the first pixel electrode, a passivation layer disposed on the first pixel electrode and the shielding electrode, and a second pixel electrode disposed on the passivation layer and partially overlapped with the first pixel electrode.

The shielding electrode is disposed on a same layer as the first pixel electrode, includes a same material as the first pixel electrode, and is disposed on the passivation layer. The first pixel electrode receives a voltage having a same level as that of a voltage received by the second pixel electrode.

The first substrate further includes a thin film transistor connected to the first and second pixel electrodes and outputs a data signal in response to a gate signal. The first and second pixel electrodes receive the data signal and charge a voltage therein.

The first substrate further includes a plurality of gate lines receiving the gate signal and a plurality of data lines receiving the data signal. The thin film transistor is connected to a corresponding gate line of the gate lines and a corresponding data line of the data lines.

The shielding electrode covers the data line when viewed in a plan view, and has a width larger than a width of the data line when viewed in a plan view.

According to the above, the liquid crystal display may reduce the misalignment of the liquid crystals and improve an aperture ratio thereof.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
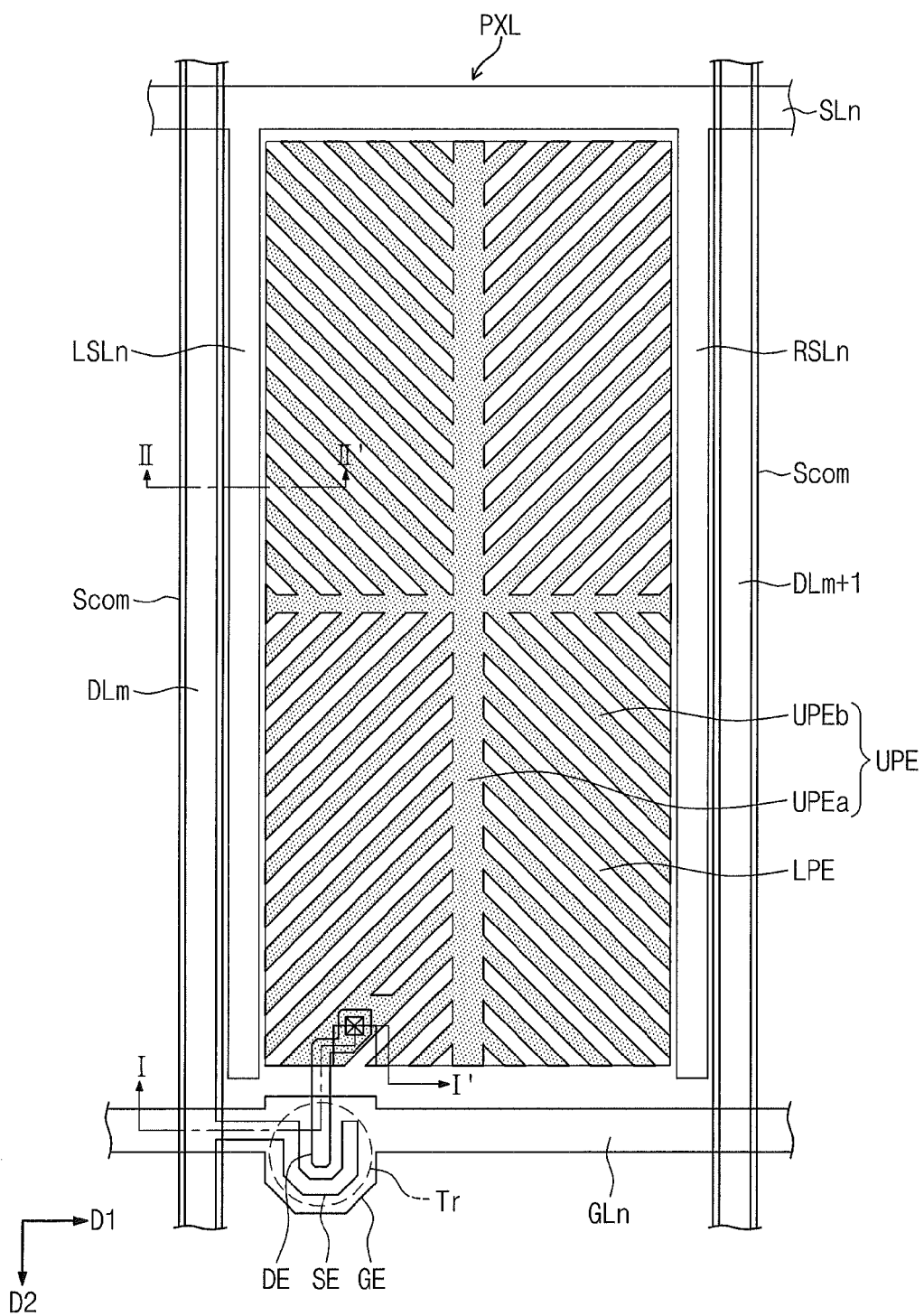
FIG. 1 is a plan view showing an exemplary embodiment of a liquid crystal display according to the invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2A:
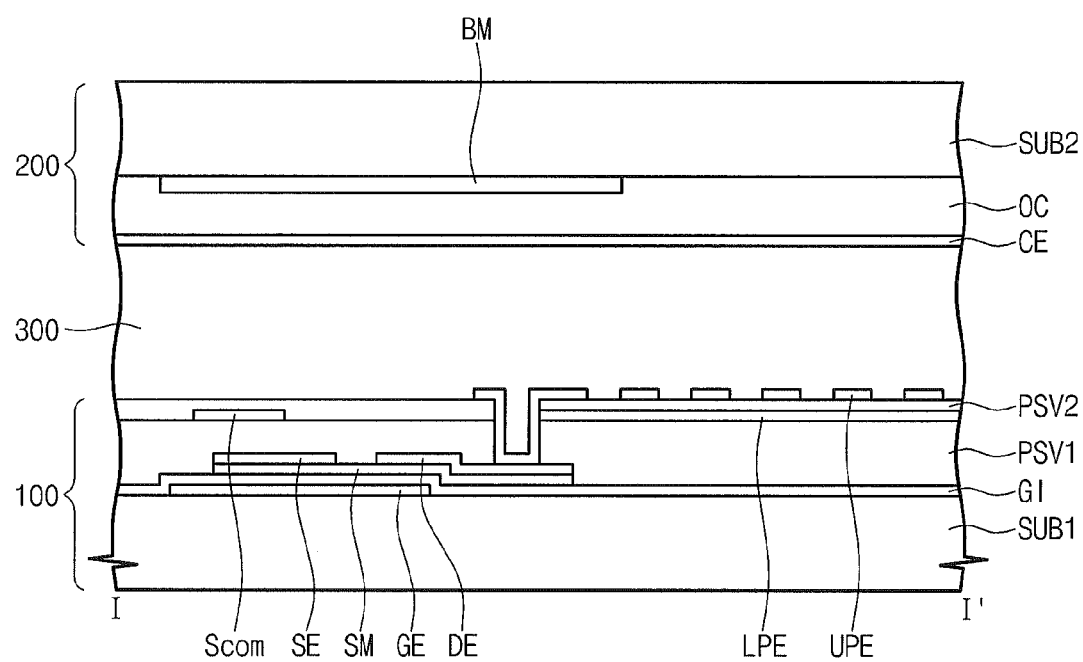
FIG. 2A is a cross-sectional view taken along line I-I' shown in FIG. 1.
Figure 2B:
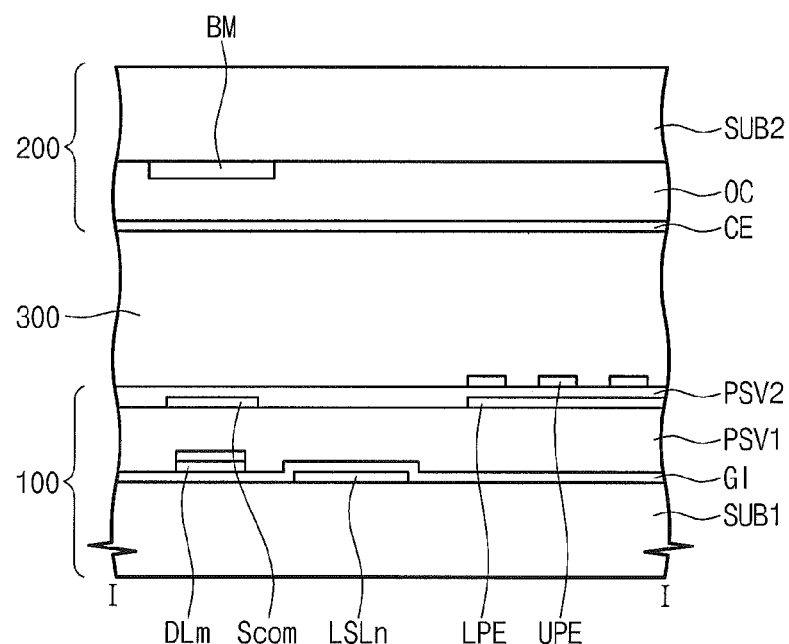
FIG. 2B is a cross-sectional view taken along line II-II' shown in FIG. 1.

FIG. 1 is a plan view showing an exemplary embodiment of a liquid crystal display according to the invention, FIG. 2A is a cross-sectional view taken along line I-I' shown in FIG. 1, and FIG. 2B is a cross-sectional view taken along line II-IF shown in FIG. 1.

Referring to FIGS. 1, 2A, and 2B, a liquid crystal display includes a first substrate 100, a second substrate 200 facing the first substrate 100, and a liquid crystal layer 300 disposed between the first substrate 100 and the second substrate 200.

The first substrate 100 is a thin film transistor array substrate on which thin film transistors are disposed to drive the liquid crystal layer 300, and the second substrate 200 is an opposite substrate to face the first substrate 100. The liquid crystal layer 300 includes liquid crystal molecules having an anisotropic dielectric constant.

The liquid crystal molecules are aligned in a vertical direction to the first and second substrates 100 and 200. When an electric field is generated between the first substrate 100 and the second substrate 200, the liquid crystal molecules are rotated in a specific direction between the first and second substrates 100 and 200 to transmit or block the light. In the exemplary embodiments, the rotation of the liquid crystal molecules means the state that the liquid crystal molecules are laid down along a horizontal direction to the first and second substrates 100 and 200. In addition, the rotation of the liquid crystal molecules means that the alignment direction of the liquid crystal molecules is changed by the electric field. The first substrate 100 includes a first base substrate SUB1 including a plurality of pixel areas defined therein. The first base substrate SUB1 includes n+p gate lines GL1, . . . , GLn, GLn+1, . . . , GL(n+p)−1, and GLn+p, m+q data lines DL1, . . . , DLm, DLm+1, . . . , DL(m+q)−1, and DLm+q, and a shielding electrode Scom to shield the data lines DL1, . . . , DLm, DLm+1, . . . , DL(m+q)−1, and DLm+q.

The pixel areas include pixels PXL, respectively. In the exemplary embodiment, each pixel PXL is connected to one corresponding gate line of the gate lines GL1, . . . , GLn, GLn+1, . . . , GL(n+p)−1, and GLn+p and one corresponding data line of the data lines DL1, . . . , DLm, DLm+1, . . . , DL(m+q)−1, and DLm+q.

For the convenience of explanation, the pixel PXL including an n-th gate line GLn and an m-th data line DLm has been shown in FIG. 1. In the illustrated exemplary embodiment, since the pixels PXL have the same structure and function, hereinafter the n-th gate line GLn and the m-th gate line DLm will be referred to as a gate line GLn and a data line DLm, respectively.

Each pixel PXL includes a thin film transistor Tr connected to the gate line GLn and the data line DLm, a lower pixel electrode LPE connected to the thin film transistor Tr, an upper pixel electrode UPE connected to the thin film transistor Tr, and a storage electrode part.

The gate line GLn is longitudinally extended in a first direction D1 on the first base substrate SUB1. The data line DLm is longitudinally extended in a second direction D2 crossing the first direction D1 while interposing a gate insulating layer GI between the gate line GLn and the data line DLm.

The thin film transistor Tr includes a gate electrode GE, a semiconductor layer SM, a source electrode SE, and a drain electrode DE.

The gate electrode GE is protruded from the gate line GLn or is on a portion of the gate line GLn.

The semiconductor layer SM is disposed on the gate insulating layer GI and overlaps with the gate electrode GE.

The source electrode SE is branched from the data line DLm such that a portion thereof is overlapped with the gate line GLn. The drain electrode DE is spaced apart from the source electrode SE while interposing the semiconductor layer SM therebetween and a portion of the drain electrode DE is overlapped with the gate line GLn.

A first passivation layer PSV1 is disposed on the first base substrate SUB1 and overlapping the source electrode SE and the drain electrode DE.

The lower pixel electrode LPE is disposed directly on the first passivation layer PSV1 in a single, unitary, indivisible body.

A second passivation layer PSV2 is disposed on the first base substrate SUB1 and overlapping the lower pixel electrode LPE, and the upper pixel electrode UPE is disposed directly on the second passivation layer PSV2 and overlapped with the lower pixel electrode LPE.

The upper pixel electrode UPE may be partially overlapped with the lower pixel electrode LPE. In the illustrated exemplary embodiment, the first and second passivation layers PSV1 and PSV2 include a contact hole extended through a thickness thereof, which exposes a portion of the drain electrode DE, and the upper pixel electrode UPE makes contact with the drain electrode DE through the contact hole. The lower pixel electrode LPE makes direct contact with the upper pixel electrode UPE in the contact hole, and thus the lower pixel electrode LPE may be electrically connected to the drain electrode DE.

The upper pixel electrode UPE includes a trunk portion UPEa and a plurality of branch portions UPEb branched from the trunk portion UPEa and spaced apart from each other. The trunk portion UPEa may have a cross shape in a plan view as shown in FIG. 1, so the pixel PXL may be divided into plural domains by the trunk portion UPEa. The branch portions UPEb are disposed in each domain and arranged in different directions according to the domains. In the illustrated exemplary embodiment, the pixel PXL includes four domains as an example. The branch portions UPEb are spaced apart from each other and do not make contact with each other, and are longitudinally extended in parallel directions to each other. In the branch portions UPEb, a distance taken perpendicular to the longitudinal extension direction and between two branch portions UPEb adjacent to each other is smaller than a few micrometers, and the branch portions UPEb are used to align the liquid crystal molecules of the liquid crystal layer 300 in a specific azimuth angle on a plane that is substantially parallel to the first base substrate SUB1.

The storage electrode part includes a storage line SLn longitudinally extended in the first direction D1, and first and second branch electrodes LSLn and RSLn branched from the storage line SLn and longitudinally extended in the second direction D2. The upper pixel electrode UPE is partially overlapped with the storage line SLn, the first branch electrode LSLn, and the second branch electrode RSLn to form a storage capacitor. In addition, the first and second branch electrodes LSLn and RSLn shield a coupling electric field generated between the data line DLm and the upper pixel electrode UPE, and between the data line DLm and the lower pixel electrode LPE.

The shielding electrode Scom is disposed directly on the first passivation layer PSV1 and spaced apart from the lower pixel electrode LPE when viewed in a plan view. The shielding electrode Scom may include the same material as the lower pixel electrode LPE. The shielding electrode Scom may in the same layer as the lower pixel electrode LPE, and in this case the shielding electrode Scom and the lower pixel electrode LPE may be formed by a single photolithography process using one mask.

When viewed in a plan view, the shielding electrode Scom covers (e.g., completely overlaps) the data line DLm and is longitudinally extended in the second direction D2 to correspond to an area including the data line DLm. The shielding electrode Scom has a width larger than a width in a direction substantially vertical to a longitudinal direction of the data line DLm. In one exemplary embodiment, for instance, the shielding electrode Scom may be larger than the width of the data line DLm by about two micrometers. Accordingly, the shielding electrode Scom may cover the data line DLm in a plan view.

In the illustrated exemplary embodiment, the shielding electrode Scom covers an area including the data line DLm, but it should not be limited thereto or thereby. That is, the shielding electrode Scom may cover not only the area including the data line DLm but also the area including the gate line GLn and/or the thin film transistor Tr.

The second substrate 200 includes a second base substrate SUB2, a black matrix BM, an overcoating layer OC, and a common electrode CE.

The black matrix BM is disposed on the second base substrate SUB2 and corresponds to the area including the data line DLm, thereby reducing or effectively preventing light leakage caused by misalignment of the liquid crystal molecules.

The overcoating layer OC is disposed on the black matrix BM and reduces a step-difference caused by the black matrix BM.

The common electrode CE is disposed on the overcoating layer OC and receives a voltage having a predetermined level to form an electric field in cooperation with the lower pixel electrode LPE and the upper pixel electrode UPE.

In the liquid crystal display having the above-mentioned structure, when a gate signal is applied to the gate line GLn, the thin film transistor Tr is turned on. Thus, a data signal applied to the data line DLm is applied to the lower pixel electrode LPE and the upper pixel electrode UPE through the thin film transistor Tr. Accordingly, the lower pixel electrode LPE and the upper pixel electrode UPE are applied with the same voltage. The common electrode CE is applied with a voltage having a different level from that of the voltage applied to the lower pixel electrode LPE and the upper pixel electrode UPE, and thus the electric field is formed between the common electrode CE and the lower pixel electrode LPE and between the common electrode CE and the upper pixel electrode UPE.

In this case, the shielding electrode Scom is applied with the same voltage as the common electrode CE, so the electric field is not formed between the shielding electrode Scom and the common electrode CE. In a conventional liquid crystal display excluding the shielding electrode Scom, liquid crystal molecules positioned in an area corresponding to an end of the pixel may be misaligned since the fringe electric field between the pixel electrode and the common electrode is weak, thereby causing a light leakage phenomenon. However, according to the illustrated exemplary embodiment, although the fringe electric field between the common electrode CE, and the lower and upper pixel electrodes LPE and UPE is weak, misalignment of the liquid crystal molecules positioned in the area corresponding to the end of the pixel may be reduced or effectively prevented since the electric field is not formed in the area including the shielding electrode Scom. As a result, the light leakage phenomenon is reduced and the size of the black matrix BM used to prevent the light leakage phenomenon is reduced, thereby improving the aperture ratio of the liquid crystal display.

In addition, the shielding electrode Scom is disposed on the same layer as the lower pixel electrode LPE, which is different from the upper pixel electrode UPE. Accordingly, the shape and size of the upper pixel electrode UPE may be variable. In an exemplary embodiment, for instance, the upper pixel electrode UPE may be extended to the area between the shielding electrode Scom and the lower pixel electrode LPE in the plan view, or overlapped with a portion of the shielding electrode Scom.

Figure 3:
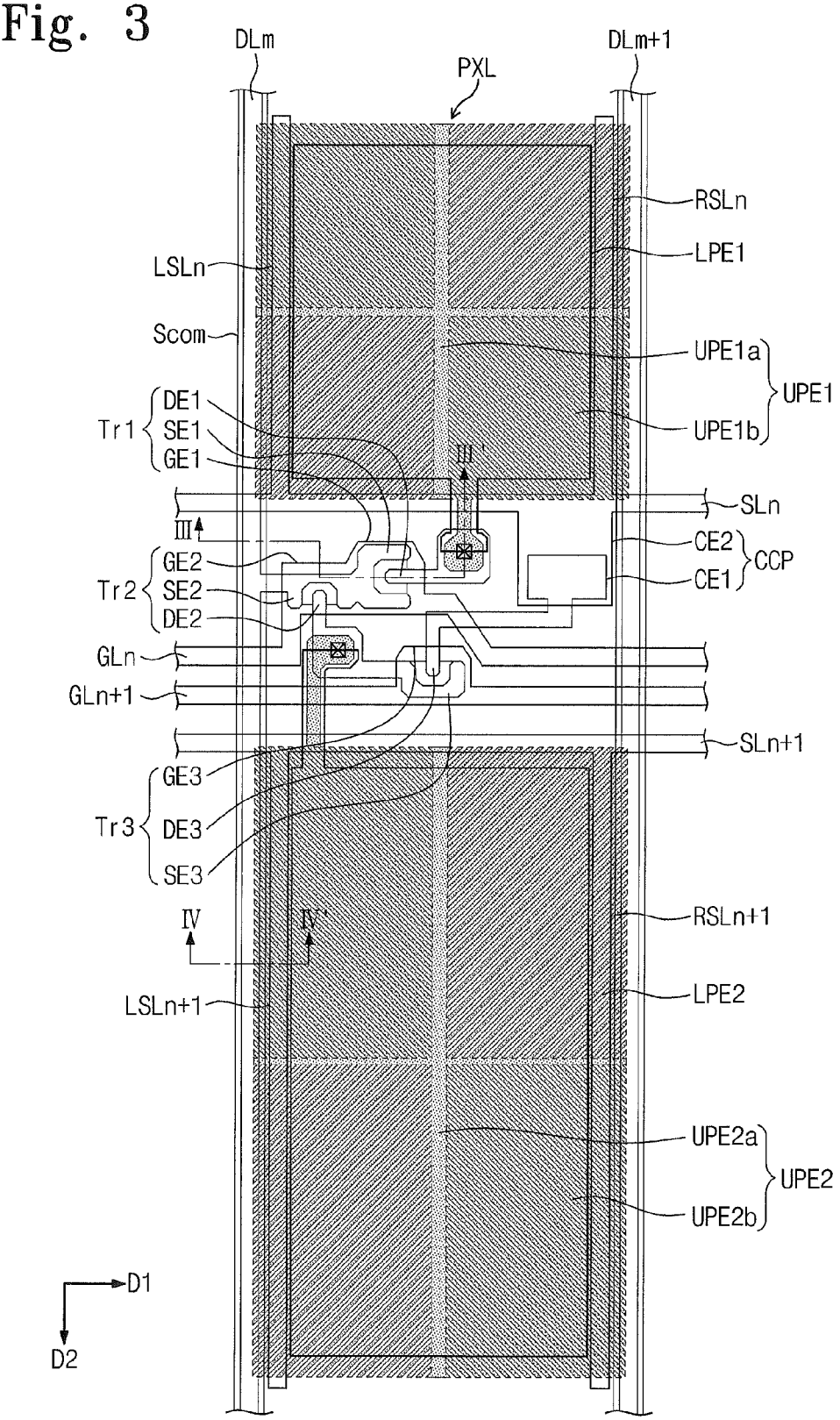
FIG. 3 is a plan view showing another exemplary embodiment of a liquid crystal display according to the invention.
Figure 4A:
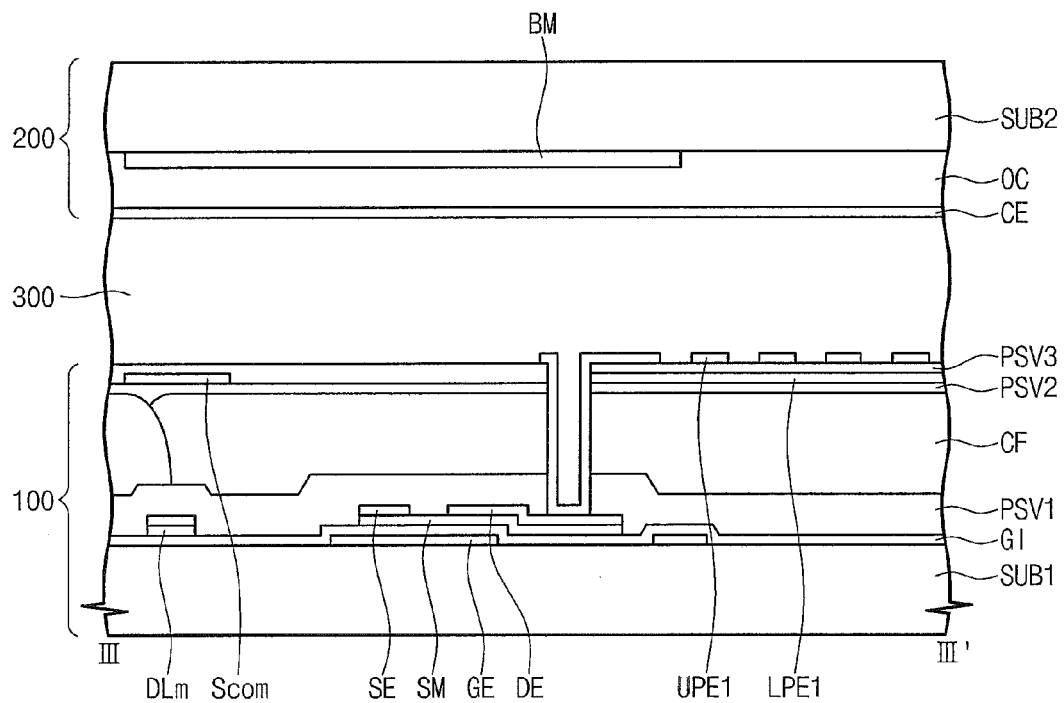
FIG. 4A is a cross-sectional view taken along line III-III' shown in FIG. 3.
Figure 4B:
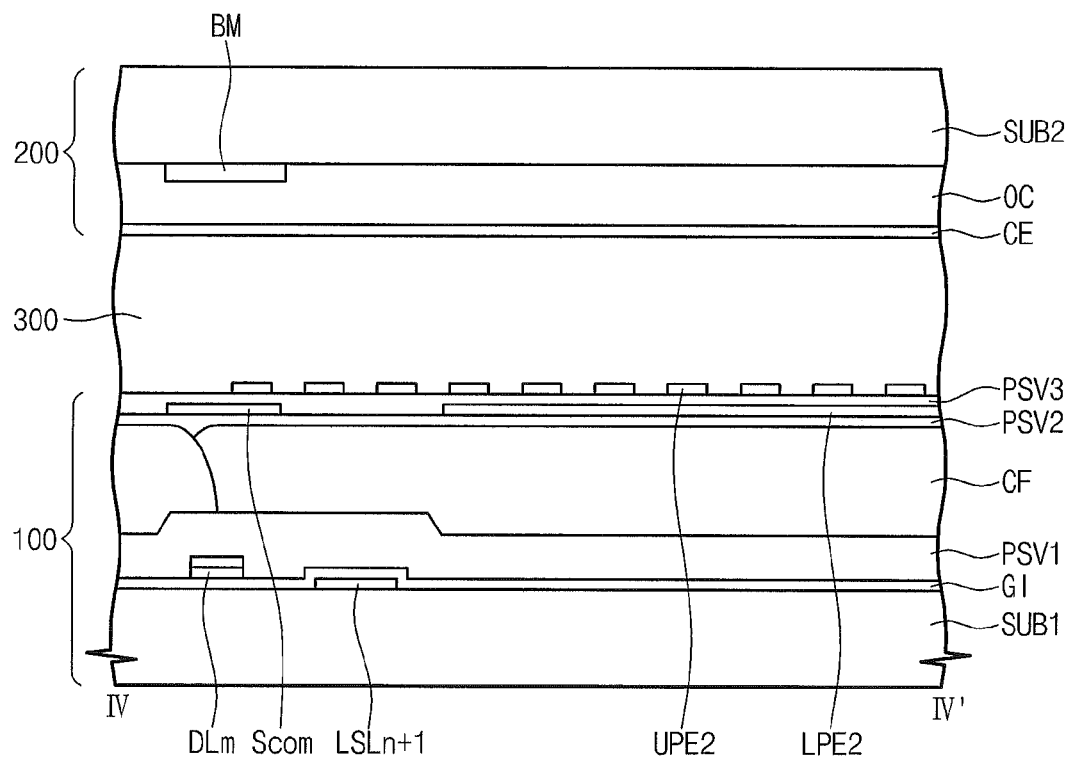
FIG. 4B is a cross-sectional view taken along line IV-IV' shown in FIG. 3.

FIG. 3 is a plan view showing another exemplary embodiment of a liquid crystal display according to the invention, FIG. 4A is a cross-sectional view taken along line III-III' shown in FIG. 3, and FIG. 4B is a cross-sectional view taken along line IV-IV' shown in FIG. 3. In FIGS. 3, 4A, and 4B, the same reference numerals denote the same elements in FIGS. 1, 2A, and 2B, and thus detailed descriptions of the same elements will be omitted.

In the liquid crystal display according to the exemplary embodiment, each pixel has a charge sharing structure and the upper pixel electrode UPE is extended to the area including the data line.

Referring to FIGS. 3, 4A, and 4B, the liquid crystal display includes a first substrate 100, a second substrate 200 facing the first substrate 100, and a liquid crystal layer 300 interposed between the first substrate 100 and the second substrate 200.

The first substrate 100 includes a first base substrate SUB1 including a plurality of pixel areas defined therein. The first base substrate SUB1 includes n+p gate lines GL1, ..., GLn, GLn+1, ..., GL(n+p)−1, and GLn+p, m+q data lines DL1, ..., DLm, DLm+1, ..., DL(m+q)−1, and DLm+q, and a shielding electrode Scom to shield the data lines DL1, ..., DLm, DLm+1, ..., DL(m+q)−1, and DLm+q.

For the convenience of explanation, one pixel PXL including an n-th gate line GLn, an (n+1)th gate line GLn+1, an m-th data line DLm, and an (m+1)th data line DLm+1 has been shown in FIGS. 3, 4A, and 4B. In the illustrated exemplary embodiment, since the pixels PXL have the same structure and function, hereinafter the n-th gate line GLn and the (n+1)th gate lines GLn+1 will be referred as to first and second gate lines, respectively, and the m-th gate line DLm and the (m+1)th data line DLm+1 will be referred to as first and second data lines, respectively.

The first and second gate lines GLn and GLn+1 are longitudinally extended in the first direction D1 on the first base substrate SUB1 and substantially parallel to each other. The first and second data lines DLm and DLm+1 are longitudinally extended in the second direction D2 crossing the first direction D1 on the gate insulating layer GI and substantially parallel to each other. Thus, the first and second data lines DLm and DLm+1 are insulated from the first and second gate lines GLn and GLn+1.

Each pixel PXL includes a first sub-pixel and a second sub-pixel. The first sub-pixel includes a first thin film transistor Tr1, a first upper pixel electrode UPE1, a first lower pixel electrode LPE1, and a first storage electrode part, and the second sub-pixel includes a second thin film transistor Tr2, a second storage electrode part, a third thin film transistor Tr3, a second upper pixel electrode UPE2, a second lower pixel electrode LPE2, and a coupling capacitor CCP. The first sub-pixel and the second sub-pixel are disposed between the first data line DLm and the second data line DLm+1, which are adjacent to each other.

The first thin film transistor Tr1 of the first sub-pixel is connected to the first data line DLm and the first gate line GLn.

The first thin film transistor Tr1 includes a first gate electrode GE1 branched from the first gate line GLn, a first source electrode SE1 branched from the first data line DLm, and a first drain electrode DE1 spaced apart from the first source electrode SE1 while interposing the semiconductor layer SM therebetween. A portion of the first drain electrode DE1 is overlapped with the first gate electrode GE1.

A first passivation layer PSV1 is disposed on the first base substrate SUB1 on which the first source electrode SE1 and the first drain electrode DE1 are disposed. Color filters CF are disposed directly on the first passivation layer PSV1 and respectively correspond to the pixels PXL, to thereby display colors. A second passivation layer PSV2 is disposed directly on the color filters CF.

The first lower pixel electrode LPE1 is on the second passivation layer PSV2 in a single body. A third passivation layer PSV3 is disposed on the first base substrate SUB1 and on the first lower pixel electrode LPE1, and the first upper pixel electrode UPE1 is disposed on the third passivation layer PSV3 and partially overlapped with the first lower pixel electrode LPE1.

The first upper pixel electrode UPE1 includes a trunk portion UPE1*a*, and a plurality of branch portions UPE1*b* extended from the trunk portion UPE1*a*. The branch portions UPE1*b* are extended to the storage electrode part or to the area including the first and second data lines DLm and DLm+1.

When viewed in a plan view, the first lower pixel electrode LPE1 includes an end (e.g., edge) portion crossing the longitudinal direction of the branch portions UPE1*b*. A portion of the end portion is positioned between the trunk portion UPE1*a* and the branch portions UPE1*b*. Accordingly, the first upper pixel electrode UPE1 includes an area overlapped with the first lower pixel electrode LPE1 and an area not overlapped with the first lower pixel electrode LPE1, and the distal ends of the branch portions UPE1*b* are positioned in the area not overlapped with the first lower pixel electrode LPE1. The distal ends of the branch portions UPE1*b* are spaced apart from the end portion of the first lower pixel electrode LPE1 by about three micrometers.

In the illustrated exemplary embodiment, the first and second passivation layers PSV1 and PSV2 include a contact hole extended through thicknesses thereof to expose a portion of the first drain electrode DE1 of the first thin film transistor Tr1, and the first upper pixel electrode UPE1 makes contact with the first drain electrode DE1 through the contact hole. The first lower pixel electrode LPE1 makes direct contact with the first upper pixel electrode UPE1 in the contact hole, and thus the first lower pixel electrode LPE1 may be electrically connected to the first drain electrode DEL The first storage electrode part includes a first storage line SLn longitudinally extended in the first direction D1, and first and second branch electrodes LSLn and RSLn branched from the first storage line SLn and longitudinally extended in the second direction D2.

The first upper pixel electrode UPE1 is partially overlapped with the first storage line SLn and the first and second branch electrodes LSLn and RSLn to form the first storage capacitor. In addition, the first and second branch electrodes LSLn and RSLn shield a coupling electric field generated between the first data line DLm and the first upper pixel electrode UPE1, between the second data line DLm+1 and the first upper pixel electrode UPE1, between the first date line DLm and the first lower pixel electrode LPE1 and between the second data line DLm+1 and the first lower pixel electrode LPE1.

The second thin film transistor Tr2 includes a second gate electrode GE2 branched from the first gate line GLn, a second source electrode SE2 branched from the first data line DLm, and a second drain electrode DE2 spaced apart from the second source electrode SE2 while interposing the semiconductor layer SM therebetween. A portion of the second drain electrode DE2 is overlapped with the second gate electrode GE2.

The first passivation layer PSV1 is disposed on the first base substrate SUB1 including the second source electrode SE2 and the second drain electrode DE2. The color filters CF are disposed on the first passivation layer PSV1, and the second passivation layer PSV2 is disposed on the color filters CF.

The second drain electrode DE2 of the second thin film transistor Tr2 is electrically connected to the second lower pixel electrode LPE2 and the second upper pixel electrode UPE2. The second lower pixel electrode LPE2 is on the second passivation layer PSV2 in a single, unitary, indivisible body. The third passivation layer PSV3 is disposed on the first base substrate SUB1 including the second lower pixel electrode LPE2, and the second upper pixel electrode UPE2 is disposed on the third passivation layer PSV3 and overlapped with the second lower pixel electrode LPE2. The second upper pixel electrode UPE2 is partially overlapped with the second lower pixel electrode LPE2.

The second upper pixel electrode UPE2 includes a trunk portion UPE2*a*, and a plurality of branch portions UPE2*b* extended from the trunk portion UPE2*a*. The branch portions UPE2*b* are extended to the storage electrode part or to the area including the first and second data lines DLm and DLm+1.

When viewed in a plan view, the second lower pixel electrode LPE2 includes an end (e.g., edge) portion crossing the longitudinal direction of the branch portions UPE2*b*. A portion of the end portion is positioned between the trunk portion UPE2a and the branch portions UPE2b. Accordingly, the second upper pixel electrode UPE2 includes an area overlapped with the second lower pixel electrode LPE2 and an area not overlapped with the second lower pixel electrode LPE2, and the ends of the branch portions UPE2b are positioned in the area not overlapped with the second lower pixel electrode LPE2. The ends of the branch portions UPE2b are spaced apart from the end portion of the second lower pixel electrode LPE2 by about three micrometers.

In the illustrated exemplary embodiment, the first and second passivation layers PSV1 and PSV2 include a contact hole extended through thicknesses thereof to expose a portion of the second drain electrode DE2 of the second thin film transistor Tr2, and the second upper pixel electrode UPE2 makes contact with the second drain electrode DE2 through the contact hole. The second lower pixel electrode LPE2 makes direct contact with the second upper pixel electrode UPE2 in the contact hole, and thus the second lower pixel electrode LPE2 may be electrically connected to the second drain electrode DE2.

The second storage electrode part includes a second storage line SLn+1 longitudinally extended in the first direction D1, and third and fourth branch electrodes LSLn+1 and RSLn+1 branched from the second storage line SLn+1 and longitudinally extended in the second direction D2.

The second upper pixel electrode UPE2 is partially overlapped with the second storage line SLn+1 and the third and fourth branch electrodes LSLn+1 and RSLn+1 to form the second storage capacitor. In addition, the third and fourth branch electrodes LSLn+1 and RSLn+1 shield a coupling electric field generated between the first data line DLm and the second upper pixel electrode UPE2, between the second data line DLm+1 and the second upper pixel electrode UPE2, between the first data line DLm and the second lower pixel electrode LPE2 and between the second data line DLm+1 and the second lower pixel electrode LPE2.

The third thin film transistor Tr3 includes a third gate electrode GE3 branched from the second gate line GLn+1, a third source electrode SE3 extended from the second drain electrode DE2, and a third drain electrode DE3 connected to the coupling capacitor CCP. The coupling capacitor CCP includes a first coupling capacitor electrode CE1 connected to the third drain electrode DE3 and a second coupling capacitor electrode CE2 extended from the second branch electrode RSLn to face the first coupling capacitor electrode CE1, thereby forming the coupling capacitor CCP. The structure of the coupling capacitor CCP should not be limited to the above-described structure.

The shielding electrode Scom is disposed on the first passivation layer PSV1 and spaced apart from the first and second lower pixel electrodes LPE1 and LPE2 when viewed in a plan view. The shielding electrode Scom may include the same material as the first and second lower pixel electrodes LPE1 and LPE2. The shielding electrode Scom may be in the same layer as the first and second lower pixel electrodes LPE1 and LPE2, and in this case the shielding electrode Scom and the first and second lower pixel electrodes LPE1 and LPE2 may be formed by a single photolithography process using one mask.

When viewed in a plan view, the shielding electrode Scom covers the first and second data lines DLm and DLm+1 and is longitudinally extended in the second direction D2 to correspond to an area including the first and second data lines DLm and DLm+1. The shielding electrode Scom has a width larger than a width in a direction substantially vertical to a longitudinal direction of the first and second data lines DLm and DLm+1. Accordingly, the shielding electrode Scom may cover the first and second data lines DLm and DLm+1 in a plan view.

In the illustrated exemplary embodiment, the shielding electrode Scom overlaps the branch portions UPE1b and UPE2b of the first and second upper pixel electrodes UPE1 and UPE2.

The second substrate 200 includes a second base substrate SUB2, a black matrix BM, an overcoating layer OC, and a common electrode CE.

The black matrix BM is disposed on the second base substrate SUB2 and corresponds to the area including the first and second data lines DLm and DLm+1, thereby preventing the light leakage caused by the misalignment of the liquid crystal molecules.

The overcoating layer OC is disposed on the black matrix BM and reduces a step-difference caused by the black matrix BM.

The common electrode CE is disposed on the overcoating layer OC and receives a voltage having a predetermined level to form an electric field in cooperation with the first and second lower pixel electrodes LPE1 and LPE2 and the first and second upper pixel electrodes UPE1 and UPE2.

According to the liquid crystal display having the above-mentioned structure, since the shielding electrode Scom is disposed on a different layer from the first and second upper pixel electrodes UPE1 and UPE2, the first and second upper pixel electrodes UPE1 and UPE2 may be extended to the upper portion of the shielding electrode Scom to be overlapped with the shielding electrode Scom. In the case that the shielding electrode Scom is disposed on the same layer as the first and second upper pixel electrodes UPE1 and UPE2, the shielding electrode Scom is needed to be spaced apart from the first and second upper pixel electrodes UPE1 and UPE2. That is, the first and second upper pixel electrodes UPE1 and UPE2 are not in the area between the shielding electrode Scom and the first and second upper pixel electrodes UPE1 and UPE2, and thus the images are not displayed in the area between the shielding electrode Scom and the first and second upper pixel electrodes UPE1 and UPE2. As a result, the aperture ratio of the liquid crystal display is lowered. According to the illustrated exemplary embodiment, however the first and second upper pixel electrodes UPE1 and UPE2 may be extended to the area between the shielding electrode Scom and the first and second upper pixel electrodes UPE1 and UPE2, so the area in which the images are displayed is widened. Consequently, the aperture ratio may be improved.

In the illustrated exemplary embodiment, the shielding electrode Scom is applied with the same voltage as the common electrode CE, so that the electric field is not formed between the shielding electrode Scom and the common electrode CE. Since the area including the shielding electrode Scom includes the area corresponding to the ends of the branch portions UPE1a and UPE2a of the first and second upper pixel electrodes UPE1 and UPE2, distortion of the electric field may be reduced or effectively prevented in the ends of the first and second upper pixel electrodes UPE1 and UPE2, thereby reducing or effectively preventing the misalignment of the liquid crystal molecules. In addition, the distortion of the electric field, which is caused by the data signal applied to the first and second data lines DLm and DLm+1, may be reduced or effectively prevented and the misalignment of the liquid crystal molecules may be reduced or effectively prevented.

Figure 5:
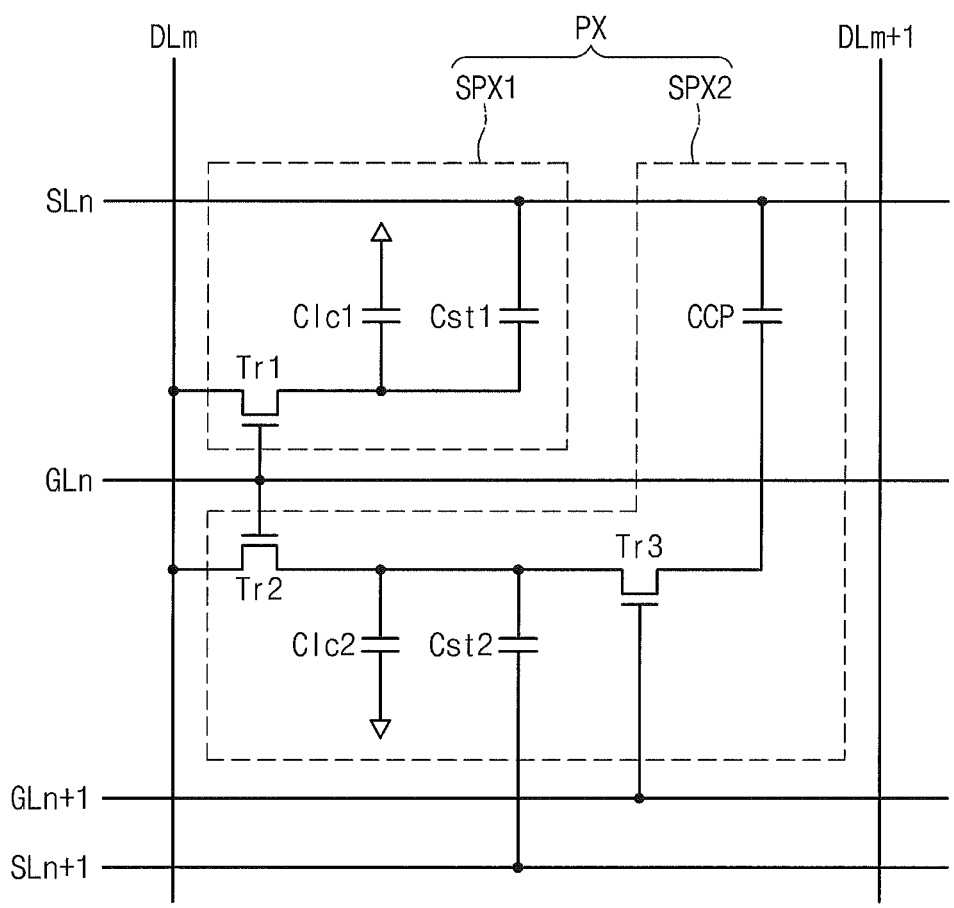
FIG. 5 is an equivalent circuit diagram of another exemplary embodiment of a liquid crystal display according to the invention.

FIG. 5 is an equivalent circuit diagram of another exemplary embodiment of a liquid crystal display according to the invention.

Referring to FIG. 5, each pixel PX includes a first sub-pixel SPX1 and a second sub-pixel SPX2. The first sub-pixel SPX1 includes a first thin film transistor Tr1, a first liquid crystal capacitor Clc1, and a first storage capacitor Cst1 and the second sub-pixel SPX2 includes a second thin film transistor Tr2, a second liquid crystal capacitor Clc2, a second storage capacitor Cst2, a third thin film transistor Tr3, and a coupling capacitor CCP. The first and second sub-pixels SPX1 and SPX2 are disposed between two data lines (hereinafter, referred to as a first data line DLm and a second data line DLm+1) adjacent to each other. In addition, the first thin film transistor Tr1 of the first sub-pixel SPX1 is connected to the first data line DLm and the first gate line GLn, and the second thin film transistor Tr2 of the second sub-pixel SPX2 is connected to the first data line DLm and the first gate line GLn. In detail, the first thin film transistor Tr1 includes a first source electrode connected to the first data line DLm, a first gate electrode connected to the first gate line GLn, and a first drain electrode connected to the first liquid crystal capacitor Clc1. The first storage capacitor Cst1 is provided between the first drain electrode and the first storage line SLn and connected to the first liquid crystal capacitor Clc1 in parallel. The second thin film transistor Tr2 includes a second source electrode connected to the first data line DLm, a second gate electrode connected to the first gate line GLn, and a second drain electrode connected to the second liquid crystal capacitor Clc2. The second storage capacitor Cst2 is provided between the second drain electrode and the second storage line SLn+1 and connected to the second liquid crystal capacitor Clc2 in parallel.

When a first gate signal is applied to the first gate line GLn, the first and second thin film transistors Tr1 and Tr2 are substantially simultaneously turned on. The data voltage applied to the first data line DLm is applied to the first and second liquid crystal capacitors Clc1 and Clc2 respectively through the turned-on first and second thin film transistors Tr1 and Tr2. Accordingly, the first and second liquid crystal capacitors Clc1 and Clc2 are charged with the same pixel voltage.

The third thin film transistor Tr3 includes a third source electrode connected to the second drain electrode of the second thin film transistor Tr2, a third gate electrode connected to the second gate line GLn+1, and a third drain electrode connected to the coupling capacitor CCP. The second gate line GLn+1 receives a second gate signal that rises after the falling transition of the first gate signal. When the third thin film transistor Tr3 is turned on in response to the second gate signal, a voltage division occurs between the second liquid crystal capacitor Clc2 and the coupling capacitor CCP. As a result, the pixel voltage charged in the second liquid crystal capacitor Clc2 is reduced. The amount of the reduction of the pixel voltage is varied depending on the charging rate of the coupling capacitor CCP. Consequently, after the second gate signal is generated, the first liquid crystal capacitor Clc1 is charged with a first pixel voltage and the second liquid crystal capacitor Clc2 is charged with a second pixel voltage lower than the first pixel voltage. Accordingly, the liquid crystal molecules positioned in an area corresponding to the first upper pixel electrode UPE1 are affected by the electric field having intensity stronger than that of the electric field applied to the liquid crystal molecules positioned in an area corresponding to the second upper pixel electrode UPE2, and thus the liquid crystal molecules positioned in the area corresponding to the first upper pixel electrode UPE1 are inclined in a different angle from that of the liquid crystal molecules positioned in the area corresponding to the second upper pixel electrode UPE2. Thus, the liquid crystal molecules have different inclination angles from each other according to the two areas, thereby compensating for the phase retardation of the light and improving the side visibility. In other words, the liquid crystal molecules in the two areas form a plurality of domains having different alignment degrees, so the side visibility may be improved, thereby improving the display quality.

Figure 6:
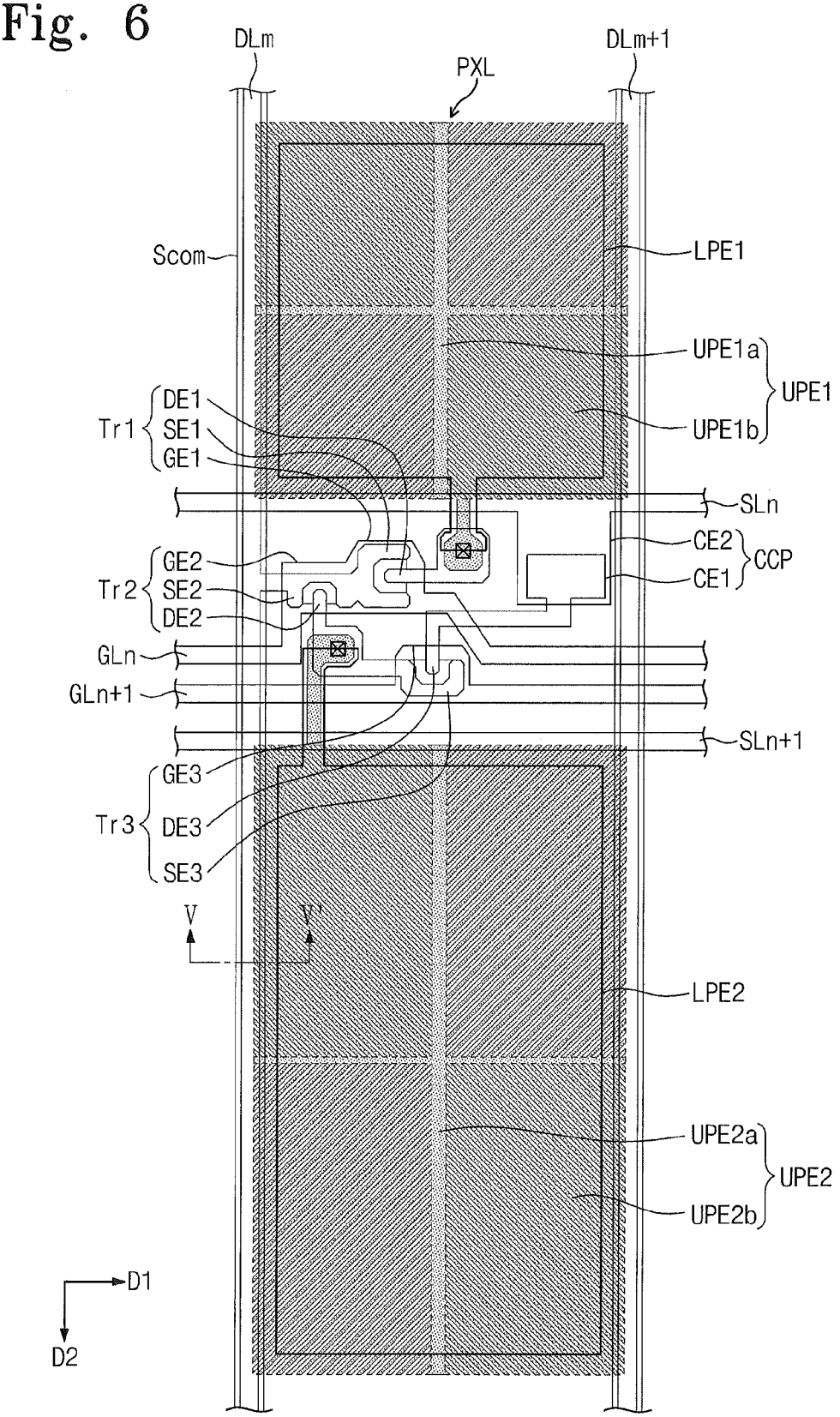
FIG. 6 is a plan view showing another exemplary embodiment of a liquid crystal display according to the invention.
Figure 7:
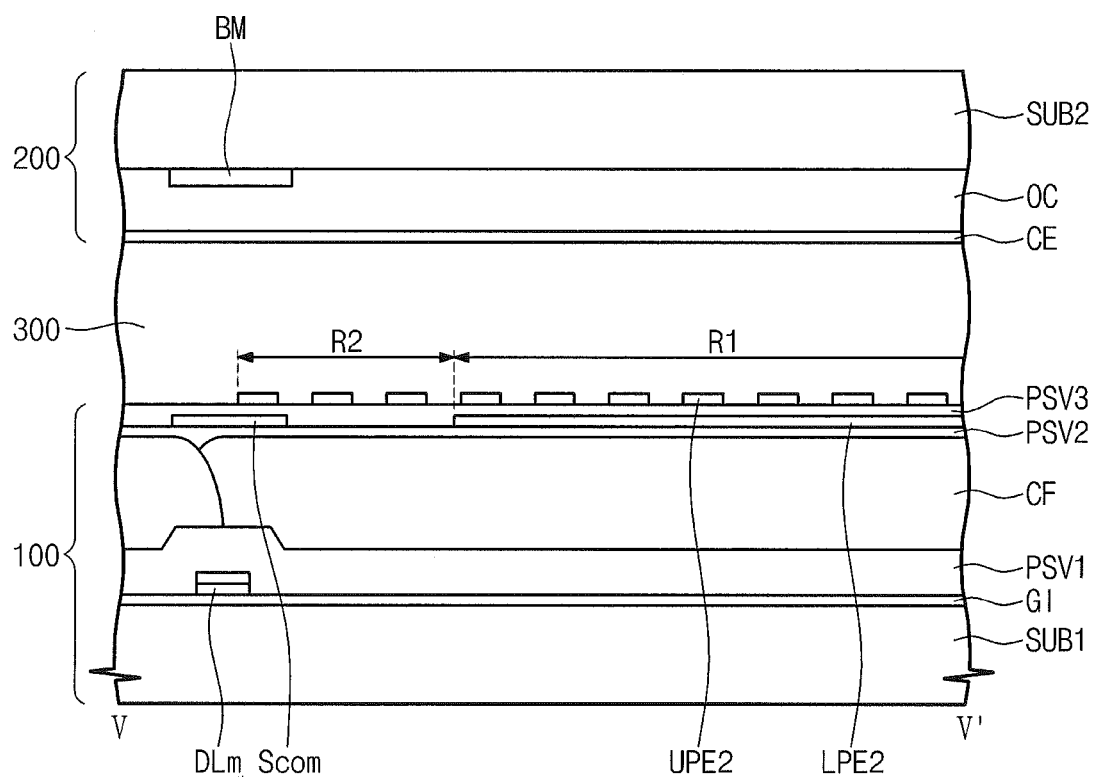
FIG. 7 is a cross-sectional view taken along line V-V' shown in FIG. 6.

FIG. 6 is a plan view showing another exemplary embodiment of a liquid crystal display according to the invention and FIG. 7 is a cross-sectional view taken along line V-V' shown in FIG. 6. In FIGS. 6 and 7, the same reference numerals denote the same elements in FIGS. 1 to 4B, and thus detailed descriptions of the same elements will be omitted.

Referring to FIGS. 6 and 7, each of the first and second lower pixel electrodes LPE1 and LPE2 is on the second passivation layer PSV2 in a single, unitary, indivisible body. The third passivation layer PSV3 is disposed on the first base substrate SUB1 including the first and second lower pixel electrodes LPE1 and LPE2, and the first and second upper pixel electrodes UPE1 and UPE2 are disposed on the third passivation layer PSV3 to correspond to the first and second lower pixel electrodes LPE1 and LPE2, respectively. The first and second upper pixel electrodes UPE1 and UPE2 are respectively partially overlapped with the first and second lower pixel electrodes LPE1 and LPE2.

The first upper pixel electrode UPE1 includes a trunk portion UPE1a and a plurality of branch portions UPE1b extended from the trunk portion UPE1a, and the second upper pixel electrode UPE2 includes a trunk portion UPE2a and a plurality of branch portions UPE2b extended from the trunk portion UPE1a. The branch portions UPE1b and UPE2b are extended to the area including the storage electrode part or the first and second data lines DLm and DLm+1.

When viewed in a plan view, the first lower pixel electrode LPE1 includes an end portion crossing the longitudinal direction of the branch portions UPE1b. A portion of the end portion is positioned between the trunk portion UPE1a and the branch portions UPE1b. Accordingly, the first upper pixel electrode UPE1 includes a first area R1 overlapped with the first lower pixel electrode LPE1 and a second area R2 not overlapped with the first lower pixel electrode LPE1, and the ends of the branch portions UPE1b are positioned in the second area R2.

In addition, the second lower pixel electrode LPE2 includes an end portion crossing the longitudinal direction of the branch portions UPE2b. A portion of the end portion is positioned between the trunk portion UPE2a and the branch portions UPE2b. Accordingly, the second upper pixel electrode UPE2 includes a first area R1 overlapped with the second lower pixel electrode LPE2 and a second area R2 not overlapped with the second lower pixel electrode LPE2, and the ends of the branch portions UPE2b are positioned in the second area R2.

The first storage electrode part includes the first storage line SLn longitudinally extended in the first direction D1. In the illustrated exemplary embodiment, the first and second branch electrodes longitudinally extended in the second direction D2 are omitted. In addition, the second storage electrode part includes the second storage line SLn+1 extended in the first direction D1, but the first and second branch electrodes extended in the second direction D2 are omitted.

The first storage line SLn and the second storage line SLn+1 are partially overlapped with the first upper pixel electrode UPE1 and the second upper pixel electrode UPE2 to respectively form the first and second storage capacitors. According to the illustrated exemplary embodiment, the first and second branch electrodes in each of the first and second storage electrode parts are omitted, and thus the image may be displayed in the areas in which the light is blocked by the first and second storage electrode parts. As a result, the aperture ratio of the liquid crystal display may be improved.

In the second area R2, the liquid crystal molecules are driven by the fringe electric field formed between the common electrode CE and the first upper pixel electrode UPE1 and between the common electrode CE and the second upper pixel electrode UPE2 since the first and second lower pixel electrodes LPE1 and LPE2 are not in the second area R2. The first and second lower pixel electrodes LPE1 and LPE2 are in the first area R1, so the liquid crystal molecules are driven by the fringe electric field formed between the common electrode CE, the first and second upper pixel electrodes UPE1 and UPE2, and the first and second lower pixel electrodes LPE1 and LPE2, respectively. Accordingly, the fringe electric field generated in the second area R1 has the intensity stronger than that in the first area R1 and the misalignment of the liquid crystal molecules may be reduced or effectively prevented, which is caused by noise electric field, thereby improving the light transmittance.

Figure 8:
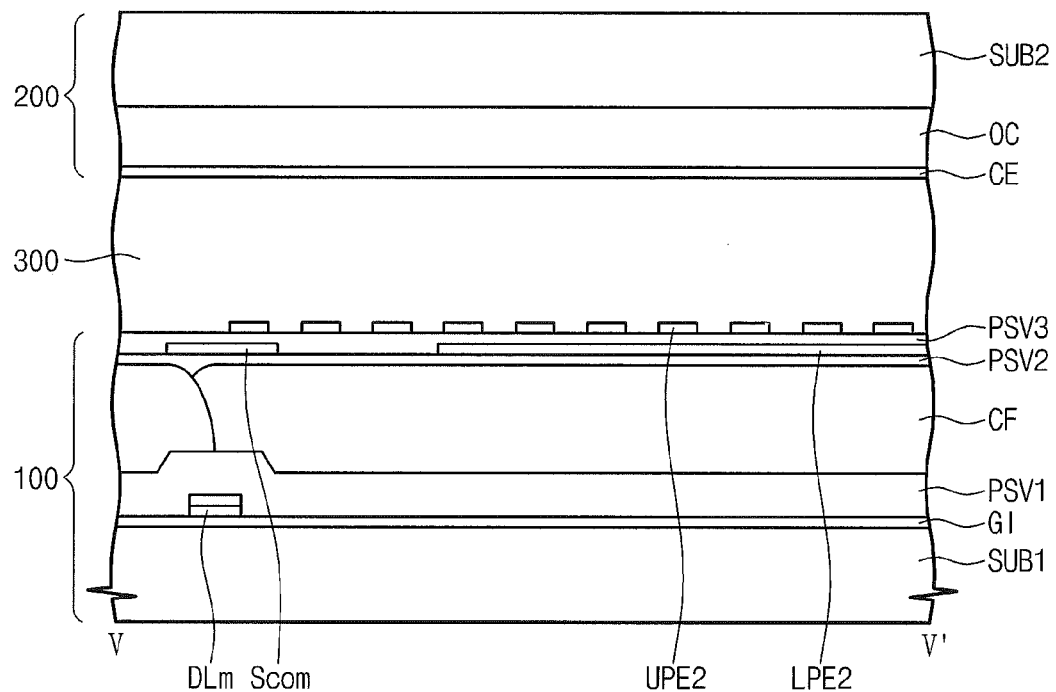
FIG. 8 is a cross-sectional view showing another exemplary embodiment of a liquid crystal display according to the invention.

FIG. 8 is a cross-sectional view showing another exemplary embodiment of a liquid crystal display according to the invention. In a plan view, the liquid crystal display according to the illustrated exemplary embodiment shown in FIG. 8 is substantially the same as the liquid crystal display shown in FIG. 6.

As described above, the shielding electrode Scom may effectively shield the coupling electric field formed between the first and second data lines DLm and DLm+1 and the first and second upper pixel electrodes UPE1 and UPE2, respectively, and between the first and second data lines DLm and DLm+1 and the first and second lower pixel electrodes LPE1 and LPE2, respectively. In addition, the shielding electrode Scom is applied with the same voltage as the common electrode CE, so the electric field is not formed in the liquid crystal layer 300 corresponding to the area including the shielding electrode Scom, thereby reducing or effectively preventing the misalignment of the liquid crystal molecules. Thus, the black matrix BM may be removed from the area corresponding to the area including the first and second data lines DLm and DLm+1, to thereby improve the aperture ratio.

Figure 9:
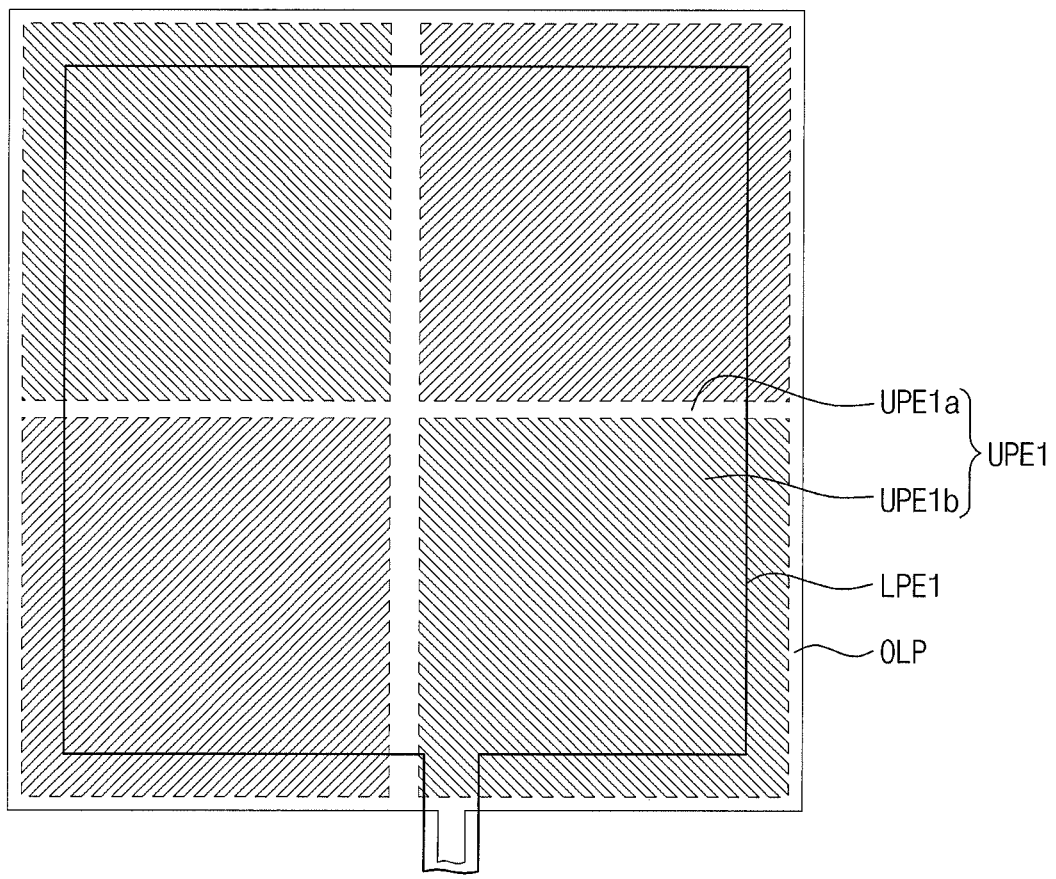
FIGS. 9, 10, and 11 are plan views showing exemplary embodiments of a first upper pixel electrode and a first lower pixel electrode of liquid crystal displays according to the invention.
Figure 10:
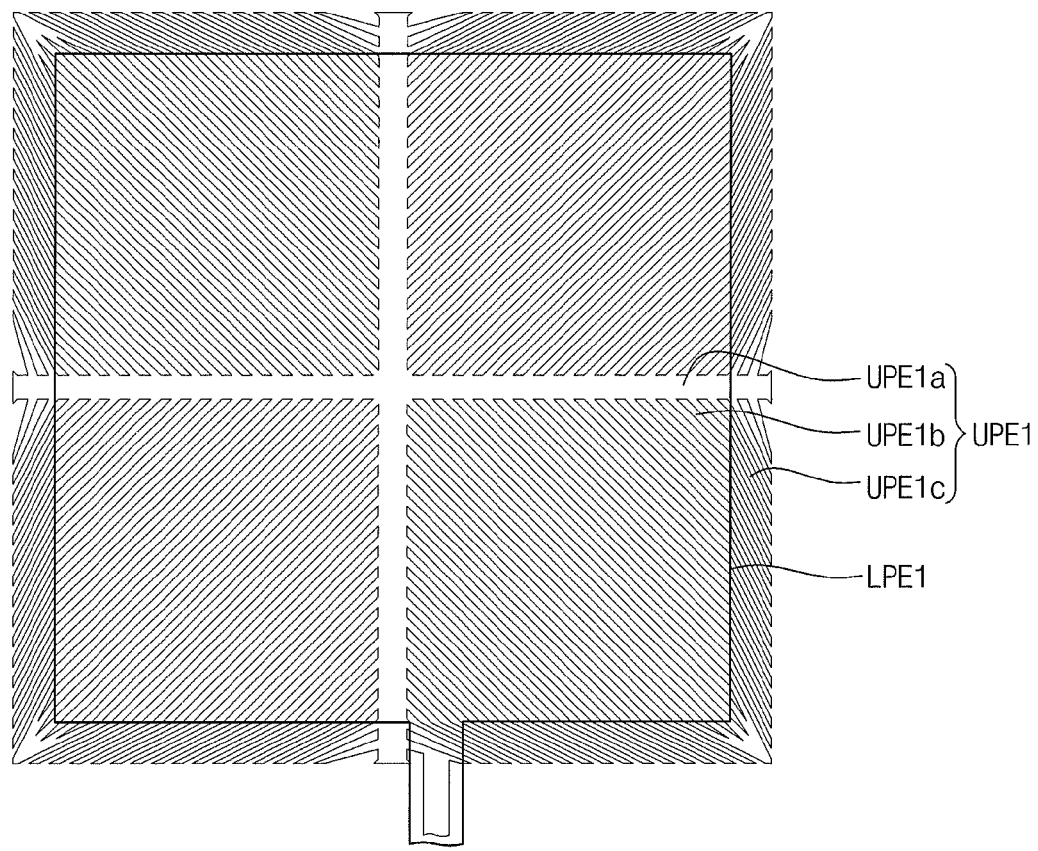
Figure 11:
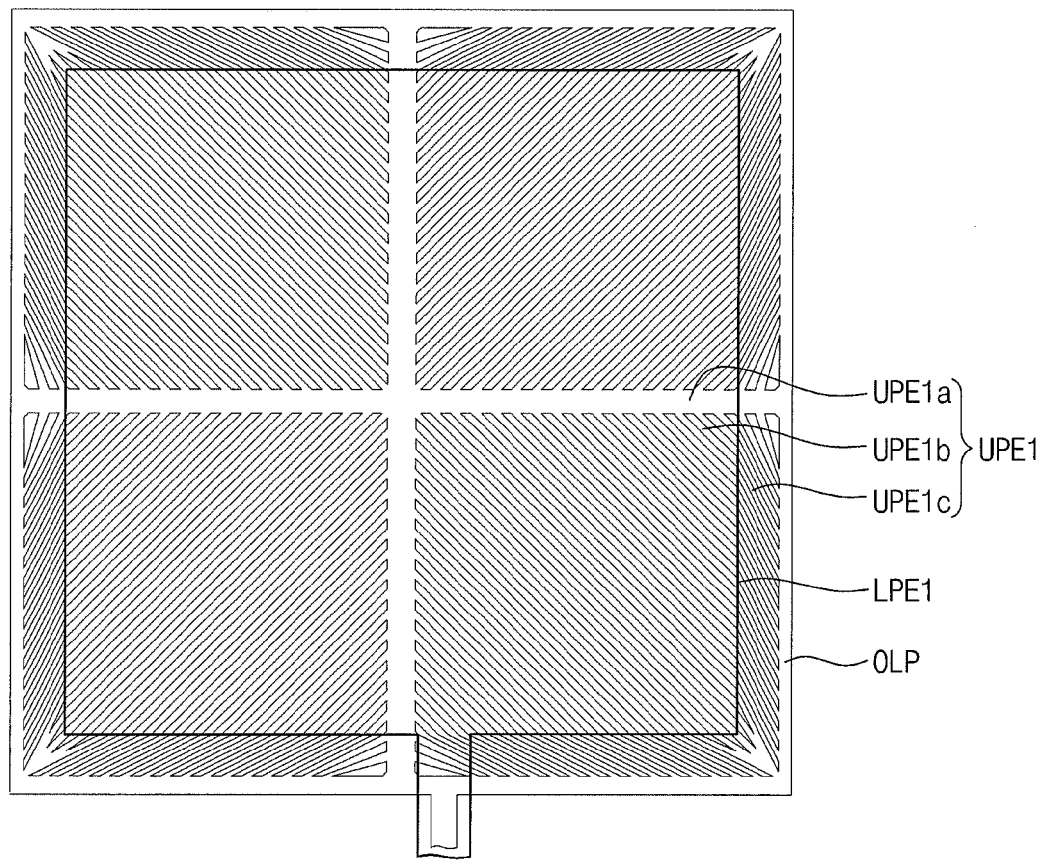

FIGS. 9, 10, and 11 are plan views showing exemplary embodiments of a first upper pixel electrode and a first lower pixel electrode of liquid crystal displays according to the invention. In FIGS. 9, 10, and 11, a first upper pixel electrode UPE1 and a first lower pixel electrode LPE1 have been shown as an example, but they should not be limited thereto or thereby.

Referring to FIG. 9, the first upper pixel electrode UPE1 includes a trunk portion UPE1$a$, a plurality of branch portions UPE1$b$ extended from the trunk portion UPE1$a$, and an outer portion OLP connecting end portions of the branch portions UPE1$b$ to each other. The outer portion OLP may connect a part of the end portions of the branch portions UPE1$b$ or all the end portions of the branch portions UPE1$b$ as shown in FIG. 9 in a closed polygonal shape.

Referring to FIG. 10, the first upper pixel electrode UPE1 includes a trunk portion UPE1$a$, a plurality of branch portions UPE1$b$ extended from the trunk portion UPE1$a$, and a plurality of bending portions UPE1$c$ respectively connected to the end portions of the branch portions UPE1$b$ and longitudinally extended in a direction at an acute angle with respect to the longitudinal direction of the branch portions UPE1$b$. The direction to which the bending portions UPE1$c$ are bent may be varied depending on the structure and shape of the pixel and the angle between the longitudinal direction of the branch portions UPE1$b$ and the extending longitudinal direction of the bending portions UPE1$c$ may be in a range of about 5 degrees to about 30 degrees. The length of each of the bending portions UPE1$c$ may be varied depending on the structure and shape of the pixel. In one exemplary embodiment, as an example, the length of each of the bending portions UPE1$c$ may be about five micrometers.

Referring to FIG. 11, the first upper pixel electrode UPE1 includes a trunk portion UPE1$a$, a plurality of branch portions UPE1$b$ extended from the trunk portion UPE1$a$, a plurality of bending portions UPE1$c$ respectively connected to the end portions of the branch portions UPE1$b$ and longitudinally extended in a direction at an acute angle with respect to the longitudinal direction of the branch portions UPE1$b$, and an outer portion OLP. The outer portion OLP may connect a part of the end portions of the bending portions UPE1$c$ or all the bending portions UPE1$c$ as shown in FIG. 11 in a closed polygonal shape.

In the exemplary embodiments described in FIGS. 9, 10, and 11, the bending portions UPE1$c$ and the outer portions OLP may improve alignability of the liquid crystal molecules corresponding to the end of the pixel.

Further, in the above-described embodiments, the liquid crystal display including plural pixels, each having two sub-pixels, has been described as a representative example, but the number of the sub-pixels should not be limited to the two sub-pixels.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A liquid crystal display comprising:
a first substrate comprising a plurality of pixel areas;
a second substrate which faces the first substrate; and
a liquid crystal layer between the first substrate and the second substrate,
the first substrate further comprising:
a first base substrate;
a thin film transistor on the first base substrate;
a first pixel electrode on the first base substrate and in each pixel area;
a shielding electrode which is spaced apart from and insulated from the first pixel electrode;
a passivation layer on the first pixel electrode and the shielding electrode, and in which a contact hole is defined and exposes a portion of the thin film transistor; and
a second pixel electrode on the passivation layer and partially overlapped with the first pixel electrode,
wherein
the second pixel electrode comprises a trunk portion, and a plurality of branch portions which are connected to the trunk portion and spaced apart from each other,
the first pixel electrode is overlapped with the trunk portion and the plurality of branch portions,
the shielding electrode is overlapped with ends of the plurality of branch portions,
the first pixel electrode receives a voltage having a same level as that of a voltage received by the second pixel electrode, and
the first pixel electrode and the second pixel electrode contact each other at the contact hole which exposes the portion of the thin film transistor, such that each pixel electrode is connected to the same thin film transistor.

2. The liquid crystal display of claim 1, wherein the shielding electrode is in a same layer as the first pixel electrode.

3. The liquid crystal display of claim 2, wherein the shielding electrode comprises a same material as the first pixel electrode.

4. The liquid crystal display of claim 3, wherein the first pixel electrode is a single, unitary, indivisible body.

5. The liquid crystal display of claim 3, wherein
the thin film transistor which is connected to the first and second pixel electrodes, outputs a data signal in response to a gate signal, and
the first and second pixel electrodes receive the data signal and charge a voltage therein.

6. The liquid crystal display of claim 5, wherein
the first substrate further comprises a plurality of gate lines which receive the gate signal, and a plurality of data lines which receive the data signal, and
the thin film transistor is connected to a gate line of the gate lines and a data line of the data lines.

7. The liquid crystal display of claim 6, wherein the shielding electrode completely overlaps the data line in a plan view.

8. The liquid crystal display of claim 7, wherein the shielding electrode has a width larger than a width of the data line in the plan view, the widths taken perpendicular to a longitudinal extension direction of the shielding electrode and the data line.

9. The liquid crystal display of claim 6, wherein the second substrate comprises:
a second base substrate; and
a common electrode on the second base substrate, wherein the common electrode forms an electric field together with the first pixel electrode and the second pixel electrode.

10. The liquid crystal display of claim 9, wherein
the first pixel electrode and the second pixel electrode both receive a first voltage, and
the shielding electrode receives a second voltage having a voltage level different from that of the first voltage.

11. The liquid crystal display of claim 9, wherein the common electrode receives a voltage having a same level as that of a voltage received by the shielding electrode.

12. The liquid crystal display of claim 9, further comprising a black matrix between the second base substrate and the common electrode, wherein the black matrix overlaps the data lines.

13. The liquid crystal display of claim 1, wherein the first pixel electrode comprises an outer edge portion which crosses a longitudinal direction of the branch portions, in a plan view.

14. The liquid crystal display of claim 13, wherein a portion of the outer edge portion of the first pixel electrode is between the trunk portion and distal end portions of the branch portions of the second pixel electrode, in the plan view.

15. The liquid crystal display of claim 14, wherein the distal end portions of the branch portions are spaced apart from the outer edge portion of the first pixel electrode by three micrometers.

16. The liquid crystal display of claim 15, wherein the second pixel electrode further comprises an outer portion which connects a portion of the distal end portions of the branch portions to each other.

17. The liquid crystal display of claim 14, wherein the second pixel electrode comprises a bending portion which is connected to each of the distal end portions of the branch portions and is longitudinally extended in a direction which forms an angle with respect to the longitudinal direction of the branch portions.

18. The liquid crystal display of claim 17, wherein the angle between the longitudinal direction of the branch portions and the extending direction of the bending portion is in a range of 5 degrees to 30 degrees.

19. The liquid crystal display of claim 18, wherein the bending portion has a longitudinal length equal to or larger than five micrometers.

20. The liquid crystal display of claim 17, wherein the second pixel electrode further comprises an outer portion which connects a portion of the distal end portions of the branch portions to each other.

* * * * *